(12) United States Patent
Larmuseau et al.

(10) Patent No.: US 12,221,320 B2
(45) Date of Patent: Feb. 11, 2025

(54) AUTOMATIC DETECTION FOR ABNORMAL MOVEMENT OF PASSENGER IN ELEVATOR

(71) Applicant: Otis Elevator Company, Farmington, CT (US)

(72) Inventors: Adriaan Joris H. Larmuseau, Shanghai (CN); Changle Li, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1424 days.

(21) Appl. No.: 16/627,053

(22) PCT Filed: Jul. 23, 2018

(86) PCT No.: PCT/CN2018/096637
§ 371 (c)(1),
(2) Date: Dec. 27, 2019

(87) PCT Pub. No.: WO2019/015691
PCT Pub. Date: Jan. 24, 2019

(65) Prior Publication Data
US 2020/0277159 A1   Sep. 3, 2020

(30) Foreign Application Priority Data
Jul. 21, 2017   (CN) .......................... 201710599113.1

(51) Int. Cl.
*B66B 1/34*   (2006.01)
*B66B 1/46*   (2006.01)
*G01S 1/68*   (2006.01)
(52) U.S. Cl.
CPC .......... *B66B 1/3476* (2013.01); *B66B 1/3461* (2013.01); *G01S 1/68* (2013.01);
(Continued)

(58) Field of Classification Search
CPC ..... B66B 1/3476; B66B 1/3461; B66B 1/468; B66B 2201/402; B66B 2201/4615;
(Continued)

(56) References Cited

U.S. PATENT DOCUMENTS 4,685,538 A    8/1987 Kamaike
4,979,594 A    12/1990 Begle et al.
(Continued)

FOREIGN PATENT DOCUMENTS

CN    202717457 U    2/2013
CN    204057529 U    12/2014
(Continued)

OTHER PUBLICATIONS

Chinese Office Action for Application No. 201810635320.2; Aug. 4, 2020; 27 Pages.
(Continued)

*Primary Examiner* — Jeffrey Donels
(74) *Attorney, Agent, or Firm* — CANTOR COLBURN LLP

(57) ABSTRACT

A movement detection system for a passenger in the present invention includes: a first Bluetooth module (150) mounted in an elevator landing area; and a movement prediction unit (270) configured to predict, based on Bluetooth movement data, that a movement of a passenger in the elevator landing area is a normal movement or an abnormal movement. The movement detection system and a movement detection method in the present invention can automatically detect an abnormal movement of a passenger, and are especially applicable to an elevator system that completes an elevator call operation without an input operation.

20 Claims, 6 Drawing Sheets

(52) U.S. Cl.
CPC ......... *B66B 1/468* (2013.01); *B66B 2201/402* (2013.01); *B66B 2201/4615* (2013.01); *B66B 2201/4638* (2013.01); *B66B 2201/4653* (2013.01); *G01S 2201/025* (2019.08)

(58) Field of Classification Search
CPC .... B66B 2201/4638; B66B 2201/4653; B66B 1/34; B66B 5/0012; B66B 2201/242; B66B 2201/403; G01S 1/68; G01S 2201/025; G01S 5/017; G01S 2205/02; G01S 5/02; H04W 4/023; H04W 4/80
See application file for complete search history.

(56) References Cited

U.S. PATENT DOCUMENTS

| | | | |
|---|---|---|---|
| 5,952,626 | A | 9/1999 | Zaharia |
| 5,984,051 | A | 11/1999 | Morgan et al. |
| 6,109,396 | A | 8/2000 | Sirag et al. |
| 6,202,799 | B1 | 3/2001 | Drop |
| 6,209,685 | B1 | 4/2001 | Zaharia et al. |
| 6,257,373 | B1 | 7/2001 | Hikita et al. |
| 6,382,363 | B1 | 5/2002 | Friedli |
| 6,397,976 | B1 | 6/2002 | Hale et al. |
| 7,377,364 | B2 | 5/2008 | Tyni et al. |
| 7,426,981 | B2 | 9/2008 | Bacellar et al. |
| 7,552,800 | B2 | 6/2009 | Puskala et al. |
| 9,926,170 | B2 * | 3/2018 | Michel ............ B66B 5/06 |
| 11,999,589 | B2 * | 6/2024 | Wedzikowski ......... B66B 1/468 |
| 2016/0236903 | A1 * | 8/2016 | Blom .................. G06Q 10/00 |
| 2017/0251338 | A1 * | 8/2017 | Huberman ............ H04W 4/33 |
| 2017/0369275 | A1 * | 12/2017 | Saraswat ............ B66B 1/3407 |
| 2018/0162688 | A1 * | 6/2018 | Troesch .................. B66B 1/468 |
| 2019/0069152 | A1 * | 2/2019 | Bhaumik ............ H04B 17/318 |

FOREIGN PATENT DOCUMENTS

| | | |
|---|---|---|
| CN | 104418220 A | 3/2015 |
| CN | 204873294 U | 12/2015 |
| CN | 204897058 U | 12/2015 |
| CN | 105293227 A | 2/2016 |
| CN | 105502111 A | 4/2016 |
| CN | 105565091 A | 5/2016 |
| CN | 105731198 A | 7/2016 |
| CN | 205472059 U | 8/2016 |
| CN | 205500480 U | 8/2016 |
| CN | 106044421 A | 10/2016 |
| CN | 106144798 A | 11/2016 |
| CN | 106219336 A | 12/2016 |
| CN | 205855656 U | 1/2017 |
| CN | 205873545 U | 1/2017 |
| CN | 106379788 A | 2/2017 |
| EP | 1189830 B1 | 10/2003 |
| JP | 2005231781 A | 9/2005 |
| JP | 2015016917 A | 1/2015 |
| JP | 5969147 B1 | 8/2016 |
| WO | 2007081345 A1 | 7/2007 |
| WO | 2014178790 A1 | 11/2014 |
| WO | 2016100293 A1 | 6/2016 |
| WO | 17050785 A1 | 3/2017 |

OTHER PUBLICATIONS

Chinese Office Action for Application No. 201810635320.2; Nov. 13, 2020; 5 Pages.
Interanational Search Report and Written Opinion for application PCT/CN2018/096637, dated Jul. 21, 2017, 11 pages.
Machado, Carlos, "Bluetooth Beacons for Tracking?", Accuware Blog, Jan. 30, 2017, 3 pages.
European Search Report for Application No. 18834633.2; Issued Mar. 26, 2021; 8 Pages.

* cited by examiner

AUTOMATIC DETECTION FOR ABNORMAL MOVEMENT OF PASSENGER IN ELEVATOR

TECHNICAL FIELD

The present invention belongs to the technical field of intelligent Elevator control, and relates to a movement detection system and method for a passenger, and an elevator system using the movement detection system.

BACKGROUND ART

As elevator technologies develop, various automatic elevator call technologies in which a passenger does not need to perform an input operation have emerged. For example, an elevator system may automatically send an elevator call request command to the elevator system according to a movement of the passenger. However, because of the uncertainties of movements of the passenger with respect to an elevator car, an invalid elevator call request command is easily generated. For example, a passenger passes an elevator landing area but does not intend to enter an elevator car to take an elevator. Such a movement easily leads to the generation of an invalid elevator call request command.

SUMMARY OF THE INVENTION

According to a first aspect of the present invention, a movement detection system for a passenger is provided, including: a first Bluetooth module mounted in an elevator landing area and configured to broadcast a first Bluetooth signal to the elevator landing area, wherein the movement detection system receives the first Bluetooth signal by a personal mobile terminal carried by the passenger, and generates Bluetooth movement data corresponding to a movement of the passenger in the elevator landing area; and the movement detection system further includes:

a movement prediction unit configured to predict, based on the Bluetooth movement data, that the movement of the passenger in the elevator landing area is a normal movement or an abnormal movement.

In the movement detection system according to an embodiment of the present invention, the movement prediction unit is further configured to predict, based on the Bluetooth movement data and historical Bluetooth data, that the movement of the passenger in the elevator landing area is a normal movement or an abnormal movement, wherein the historical Bluetooth movement data includes historical Bluetooth movement data corresponding to the normal movement and/or abnormal movement.

In the movement detection system according to another embodiment of the present invention or any embodiment in the foregoing, the historical Bluetooth data is historical Bluetooth data corresponding to the passenger.

In the movement detection system according to another embodiment of the present invention or any embodiment in the foregoing, the movement detection system further includes:

a personal movement historical database, disposed corresponding to the personal mobile terminal, and storing historical Bluetooth movement data corresponding to the passenger.

In the movement detection system according to another embodiment of the present invention or any embodiment in the foregoing, the movement detection system tracks the corresponding movement of the passenger in the elevator landing area based on Bluetooth interaction between the personal mobile terminal and the first Bluetooth module, so as to generate the Bluetooth movement data corresponding to the movement.

In the movement detection system according to another embodiment of the present invention or any embodiment in the foregoing, the movement detection system further includes: a machine learning unit configured to learn and acquire a normal movement mode from historical Bluetooth movement data corresponding to the normal movement, and/or configured to learn and acquire an abnormal movement mode from historical Bluetooth movement data corresponding to the abnormal movement.

In the movement detection system according to another embodiment of the present invention or any embodiment in the foregoing, the movement detection system further includes: a machine learning unit configured to learn and acquire a normal movement mode of the passenger from historical Bluetooth movement data corresponding to the normal movement of the passenger, and/or configured to learn and acquire an abnormal movement mode of the passenger from historical Bluetooth movement data corresponding to the abnormal movement of the passenger.

In the movement detection system according to another embodiment of the present invention or any embodiment in the foregoing, the movement prediction unit is further configured to predict, based on the generated Bluetooth movement data and the normal movement mode and/or abnormal movement mode, that the movement of the passenger in the elevator landing area is a normal movement or an abnormal movement.

In the movement detection system according to another embodiment of the present invention or any embodiment in the foregoing, the movement detection system further includes a signal strength determination module and a movement tracking module that are disposed in the personal mobile terminal, wherein the signal strength determination module is configured to determine the signal strength of the first Bluetooth signal received by the personal mobile terminal; and the movement tracking module is configured to track the movement of the passenger in the elevator landing area by means of changes in the determined signal strength of the first Bluetooth signal, and generate the Bluetooth movement data corresponding to the movement.

In the movement detection system according to another embodiment of the present invention or any embodiment in the foregoing, the movement tracking module is further configured to analyze a change direction of the signal strength of the first Bluetooth signal, and track a movement direction of the passenger with respect to the first Bluetooth module in the elevator landing area based on the change direction.

In the movement detection system according to another embodiment of the present invention or any embodiment in the foregoing, the movement tracking module is further configured to analyze a change magnitude of the signal strength of the first Bluetooth signal, and track a movement distance of the passenger with respect to the first Bluetooth module in the elevator landing area based on the change magnitude.

In the movement detection system according to another embodiment of the present invention or any embodiment in the foregoing, the movement detection system further includes a second Bluetooth module mounted in an elevator car and configured to broadcast a second Bluetooth signal to the interior of the elevator car, wherein the movement detection system further includes a movement judgment module disposed in the personal mobile terminal, the movement judgment module being configured to judge, according to whether the personal mobile terminal successfully receives the second Bluetooth signal, whether the tracked movement is a normal movement or an abnormal movement.

In the movement detection system according to another embodiment of the present invention or any embodiment in the foregoing, the movement judgment module is further configured to:

judge that the tracked movement is a normal movement if the personal mobile terminal successfully receives the second Bluetooth signal whose signal strength is greater than or equal to a predetermined value; and/or judge that the tracked movement is an abnormal movement if the personal mobile terminal does not receive the second Bluetooth signal within a predetermined time period after sending an elevator call request command or does not receive the second Bluetooth signal whose signal strength is greater than or equal to a predetermined value.

In the movement detection system according to another embodiment of the present invention or any embodiment in the foregoing, the Bluetooth movement data corresponding to the normal movement or the abnormal movement of the passenger is stored respectively in a normal movement historical database or an abnormal movement historical database of the personal movement historical database.

In the movement detection system according to another embodiment of the present invention or any embodiment in the foregoing, the second Bluetooth module and/or an elevator controller of an elevator system is further configured to receive the judgment result for the tracked movement.

In the movement detection system according to another embodiment of the present invention or any embodiment in the foregoing, the movement prediction unit is further configured to transmit the result about the movement predicted by the movement prediction unit to at least one of the personal mobile terminal, the first Bluetooth module, and an elevator controller of an elevator system.

In the movement detection system according to another embodiment of the present invention or any embodiment in the foregoing, the movement detection system is further configured to: if the movement of the passenger in the elevator landing area is predicted to be an abnormal movement, skip automatically sending an elevator call request command or cancel an elevator call request command sent corresponding to the movement.

In the movement detection system according to another embodiment of the present invention or any embodiment in the foregoing, the movement detection system is further configured to provide the signal strength distribution diagram of the first Bluetooth signal of each elevator landing area to the personal mobile terminal.

In the movement detection system according to another embodiment of the present invention or any embodiment in the foregoing, at least one of the personal movement historical database, the machine learning unit, and the movement prediction unit of the movement detection system is disposed in the personal mobile terminal.

In the movement detection system according to another embodiment of the present invention or any embodiment in the foregoing, the movement detection system further includes a server configured to implement one or more of the personal movement historical database, the machine learning unit, and the movement prediction unit of the movement detection system.

In the movement detection system according to another embodiment of the present invention or any embodiment in the foregoing, one or more of the personal movement historical database, the machine learning unit, and the movement prediction unit of the movement detection system are implemented in a cloud.

In the movement detection system according to another embodiment of the present invention or any embodiment in the foregoing, the second Bluetooth module is a Bluetooth Low Energy (BLE) module, and the second Bluetooth signal is a BLE signal; and/or the first Bluetooth module is a BLE module, and the first Bluetooth signal is a BLE signal.

According to a second aspect of the present invention, a movement detection method for a passenger is provided, including steps of:

receiving, by a personal mobile terminal carried by the passenger, a first Bluetooth signal broadcasted by a first Bluetooth module mounted in an elevator landing area;

generating Bluetooth movement data corresponding to a movement of the passenger in the elevator landing area; and predicting, based on the Bluetooth movement data, that the movement of the passenger in the elevator landing area is a normal movement or an abnormal movement.

In the movement detection method according to an embodiment of the present invention, the step of predicting the movement includes: predicting, based on historical Bluetooth data of the generated Bluetooth movement data, that the movement of the passenger in the elevator landing area is a normal movement or an abnormal movement, wherein the historical Bluetooth movement data includes historical Bluetooth movement data corresponding to the normal movement and/or abnormal movement.

In the movement detection method according to another embodiment of the present invention or any embodiment in the foregoing, the historical Bluetooth data is historical Bluetooth data corresponding to the passenger.

In the movement detection method according to another embodiment of the present invention or any embodiment in the foregoing, the step of generating Bluetooth movement data includes: tracking the corresponding movement of the passenger in the elevator landing area based on Bluetooth interaction between the personal mobile terminal and the first Bluetooth module, thereby generating the Bluetooth movement data corresponding to the movement.

In the movement detection method according to another embodiment of the present invention or any embodiment in the foregoing, the movement detection method further includes a machine learning step: learning and acquiring a normal movement mode from historical Bluetooth movement data corresponding to the normal movement, and/or learning and acquiring an abnormal movement mode from historical Bluetooth movement data corresponding to the abnormal movement.

In the movement detection method according to another embodiment of the present invention or any embodiment in the foregoing, the movement detection method further includes a machine learning step: learning and acquiring a normal movement mode of the passenger from historical Bluetooth movement data corresponding to the normal movement of the passenger, and/or learning and acquiring an abnormal movement mode of the passenger from historical Bluetooth movement data corresponding to the abnormal movement of the passenger.

In the movement detection method according to another embodiment of the present invention or any embodiment in the foregoing, the step of predicting the movement includes: further predicting, based on the normal movement mode and/or abnormal movement mode corresponding to the passenger, that the movement is a normal movement or an abnormal movement.

In the movement detection method according to another embodiment of the present invention or any embodiment in the foregoing, the movement detection method further includes steps of:

determining the signal strength of the first Bluetooth signal received by the personal mobile terminal; and tracking the movement of the passenger in the elevator landing area by means of changes in the determined signal strength of the first Bluetooth signal.

In the movement detection method according to another embodiment of the present invention or any embodiment in the foregoing, the step of tracking the movement of the passenger in the elevator landing area includes:

analyzing a change direction of the signal strength of the first Bluetooth signal, and tracking a movement direction of the passenger with respect to the first Bluetooth module in the elevator landing area based on the change direction.

In the movement detection method according to another embodiment of the present invention or any embodiment in the foregoing, the step of tracking the movement of the passenger in the elevator landing area includes:

analyzing a change magnitude of the signal strength of the first Bluetooth signal, and tracking a movement distance of the passenger with respect to the first Bluetooth module in the elevator landing area based on the change magnitude.

In the movement detection method according to another embodiment of the present invention or any embodiment in the foregoing, the movement detection method further includes steps:

receiving a second Bluetooth signal broadcasted by a second Bluetooth module mounted in an elevator car; and judging, according to whether the personal mobile terminal successfully receives the second Bluetooth signal, whether the tracked movement is correspondingly a normal movement or an abnormal movement.

In the movement detection method according to another embodiment of the present invention or any embodiment in the foregoing, the step of judging the tracked movement includes:

judging that the tracked movement is a normal movement if the personal mobile terminal successfully receives the second Bluetooth signal whose signal strength is greater than or equal to a predetermined value; and/or judging that the tracked movement is an abnormal movement if the personal mobile terminal does not receive the second Bluetooth signal within a predetermined time period after sending an elevator call request command or does not receive the second Bluetooth signal whose signal strength is greater than or equal to a predetermined value.

In the movement detection method according to another embodiment of the present invention or any embodiment in the foregoing, the Bluetooth movement data corresponding to the normal movement or the abnormal movement of the passenger is stored respectively in a normal movement historical database or an abnormal movement historical database of a personal movement historical database.

In the movement detection method according to another embodiment of the present invention or any embodiment in the foregoing, the movement detection method further includes a step of: receiving, by the second Bluetooth module and/or an elevator controller of an elevator system, the judgment result for the tracked movement.

In the movement detection method according to another embodiment of the present invention or any embodiment in the foregoing, the movement detection method further includes a step of: transmitting the prediction result about the movement to at least one of the personal mobile terminal, the first Bluetooth module, and an elevator controller of an elevator system.

In the movement detection method according to another embodiment of the present invention or any embodiment in the foregoing, the movement detection method further includes a step of: if the movement of the passenger in the elevator landing area is predicted to be an abnormal movement, skipping automatically sending an elevator call request command or cancelling an elevator call request command sent corresponding to the movement.

In the movement detection method according to another embodiment of the present invention or any embodiment in the foregoing, the signal strength distribution diagram of the first Bluetooth signal of each elevator landing area is provided to the personal mobile terminal.

According to a third aspect of the present invention, a personal mobile terminal is provided, including:

a Bluetooth interaction unit configured to enable a personal mobile terminal carried by a passenger who moves in an elevator landing area to receive a first Bluetooth signal broadcasted by a first Bluetooth module mounted in the elevator landing area, and generate corresponding Bluetooth movement data; and a movement prediction unit configured to predict, based on the Bluetooth movement data, that a movement of the passenger in the elevator landing area is a normal movement or an abnormal movement.

In the personal mobile terminal according to an embodiment of the present invention, the movement prediction unit is further configured to predict, based on the Bluetooth movement data and historical Bluetooth movement data of the passenger, that the movement of the passenger in the elevator landing area is a normal movement or an abnormal movement, where the historical Bluetooth movement data includes historical Bluetooth movement data corresponding to the normal movement and/or abnormal movement of the passenger.

In the personal mobile terminal according to an embodiment of the present invention, a corresponding personal movement historical database is disposed in the personal mobile terminal, and stores the historical Bluetooth movement data corresponding to the passenger.

In the personal mobile terminal according to an embodiment of the present invention, the movement prediction unit is further configured to track the corresponding movement of the passenger in the elevator landing area based on Bluetooth interaction between the personal mobile terminal and the first Bluetooth module, so as to generate the Bluetooth movement data corresponding to the movement.

In the personal mobile terminal according to an embodiment of the present invention, the personal mobile terminal further includes: a machine learning unit configured to learn and acquire a corresponding normal movement mode of the passenger from historical Bluetooth movement data corresponding to the normal movement, and/or configured to learn and acquire a corresponding abnormal movement mode of the passenger from historical Bluetooth movement data corresponding to the abnormal movement.

In the personal mobile terminal according to an embodiment of the present invention, the movement prediction unit is further configured to predict, based on the generated Bluetooth movement data and the normal movement mode and/or abnormal movement mode of the passenger, that the movement of the passenger in the elevator landing area is a normal movement or an abnormal movement.

In the personal mobile terminal according to an embodiment of the present invention, the personal mobile terminal further includes:

a signal strength determination module configured to determine the signal strength of the first Bluetooth signal received by the personal mobile terminal; and a movement tracking module configured to track the movement of the passenger in the elevator landing area based on changes in the determined signal strength of the first Bluetooth signal, and generate the Bluetooth movement data corresponding to the movement.

In the personal mobile terminal according to an embodiment of the present invention, the movement tracking module is further configured to analyze a change direction of the signal strength of the first Bluetooth signal, and track a movement direction of the passenger with respect to the first Bluetooth module in the elevator landing area based on the change direction.

In the personal mobile terminal according to an embodiment of the present invention, the movement tracking module is further configured to analyze a change magnitude of the signal strength of the first Bluetooth signal, and track a movement distance of the passenger with respect to the first Bluetooth module in the elevator landing area based on the change magnitude.

According to a fourth aspect of the present invention, an elevator system is provided, including an elevator car, an elevator controller, and any movement detection system in the foregoing, wherein the first Bluetooth module is further configured to receive an elevator call request command sent from the personal mobile terminal.

In the elevator system according to an embodiment of the present invention, the elevator controller or the first Bluetooth module is configured to: if a movement of the passenger in the elevator landing area is predicted to be an abnormal movement, ignore or cancel the elevator call request command sent by the personal mobile terminal corresponding to the movement.

In the elevator system according to an embodiment of the present invention, the first Bluetooth module is further configured to receive the result about the movement predicted by the movement prediction unit.

According to a fifth aspect of the present invention, a personal mobile terminal is provided, including a memory, a processor, and a computer program stored in the memory and operable on the processor, wherein the processor, when executing the program, implements the steps in any method in the second aspect of the present invention.

According to a sixth aspect of the present invention, a computer readable storage medium storing a computer program is provided. The program can be executed by a processor to implement the steps in any method in the second aspect of the present invention.

The foregoing features and operations of the present invention will become more obvious according to the following descriptions and the accompanying drawings.

BRIEF DESCRIPTION OF THE DRAWINGS

The foregoing and other objectives and advantages of the present invention will become more complete and clearer through the following detailed descriptions with reference to the accompanying drawings, and identical or similar elements are represented by identical reference numerals.

DETAILED DESCRIPTION

The present invention is described here more completely with reference to the accompanying drawings. Exemplary embodiments of the present invention are shown in the accompanying drawings. However, the present invention may be implemented in many different forms, and such forms should not be construed as being limited to the embodiments described here. On the contrary, these embodiments are provided to make the present disclosure more thorough and complete and completely convey the concept of the present invention to those skilled in the art.

The features of the present invention are disclosed with reference to only one of several implementations/embodiments. However, provided that any given or recognizable function may be expected and/or beneficial, this feature may be combined with one or more other features in other implementations/embodiments Some of the block diagrams shown in the accompanying drawings are functional entities, and do not necessarily correspond to physically or logically independent entities. These functional entities may be implemented in the form of software. Alternatively, these functional entities are implemented in one or more hardware modules or integrated circuits. Alternatively, these functional entities are implemented in different processing apparatuses and/or microcontroller apparatuses.

Herein, a "normal movement" is at least one movement of a passenger with respect to an elevator car in order to take an elevator. In contrast, an "abnormal movement" is a movement of a passenger near an elevator car while the passenger does not intend to take an elevator. The "normal movement" and the "abnormal movement" may both include a movement process of approaching the elevator car. However, in the present application, a movement of approaching the elevator car does not necessarily means it is a "normal movement".

Figure 1:
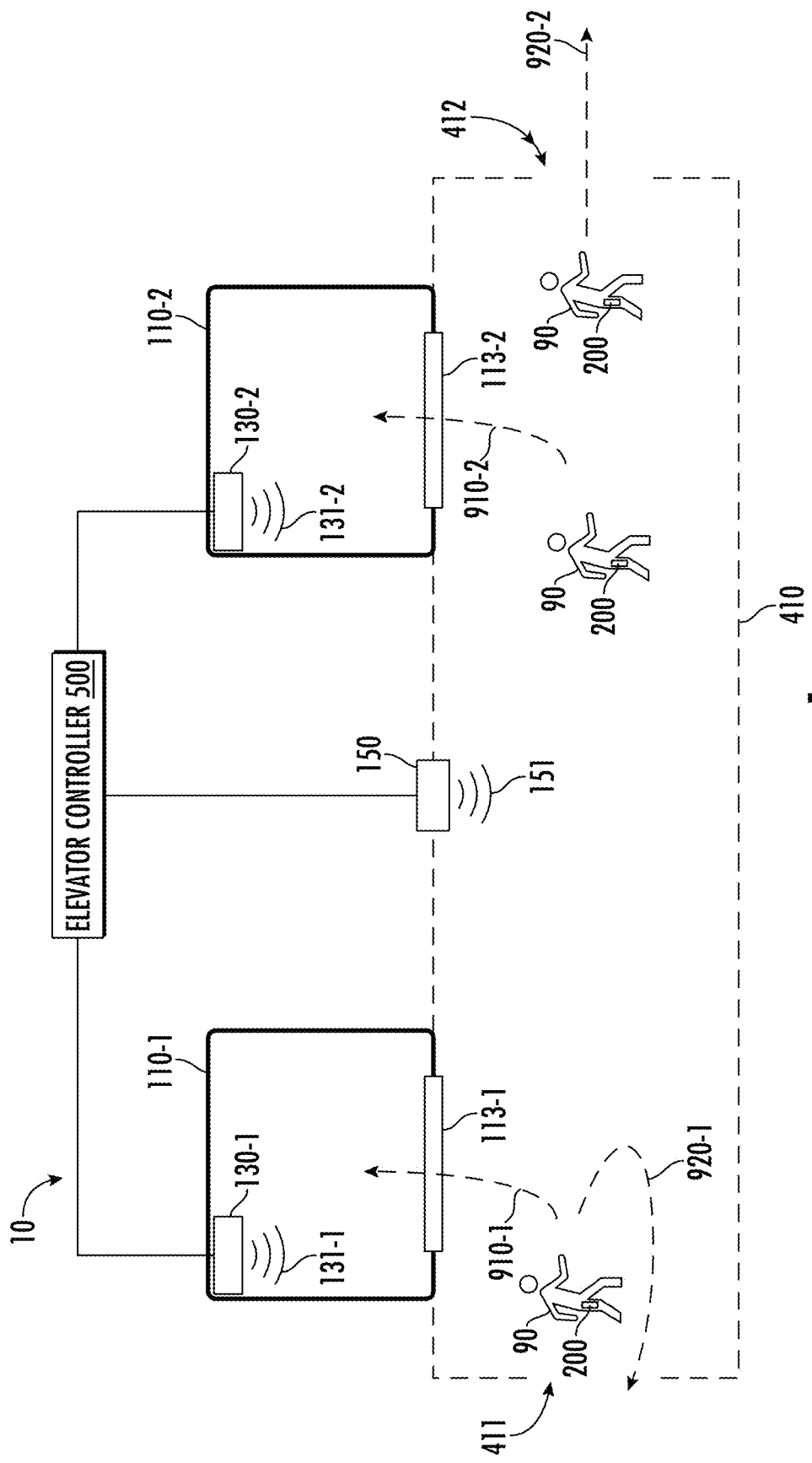
FIG. 1 is a schematic diagram of an elevator system according to an embodiment of the present invention, and at the same time schematically shows a movement detection system for a passenger according to an embodiment.
Figure 2:
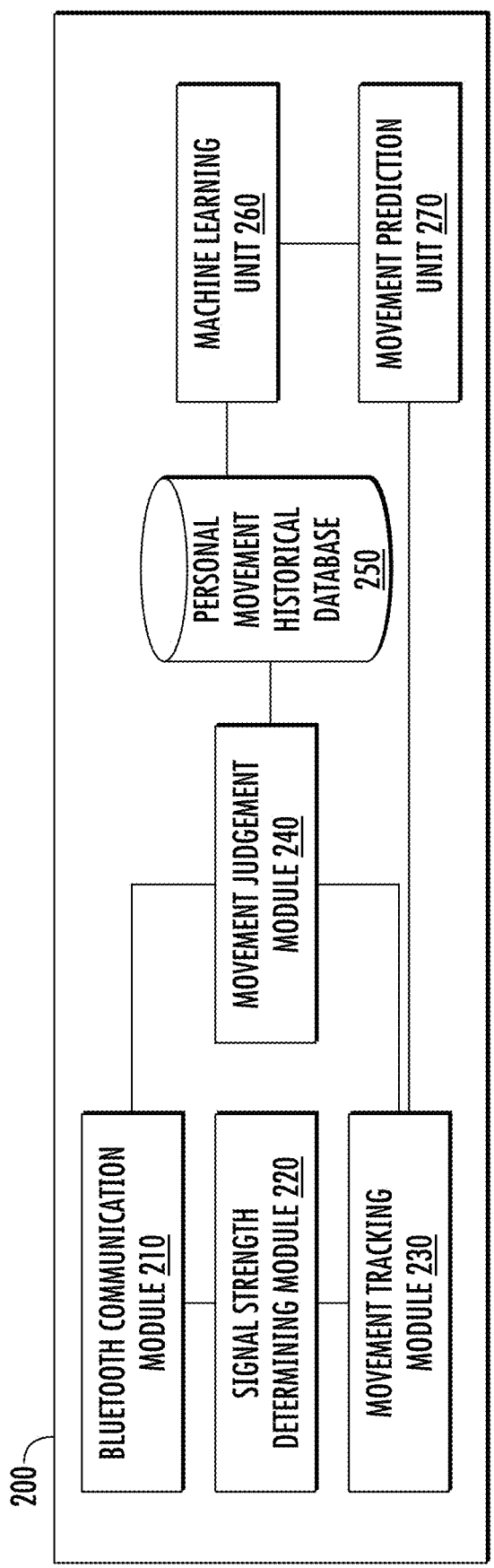
FIG. 2 is a schematic diagram of a modular structure when at least a part of the movement detection system shown in FIG. 1 is implemented by using a personal mobile terminal according to an embodiment.

FIG. 1 is a schematic diagram of an elevator system according to an embodiment of the present invention, and at the same time schematically shows a movement detection system for a passenger according to an embodiment. FIG. 2 is a schematic diagram of a modular structure when at least a part of the movement detection system shown in FIG. 1 is implemented by using a personal mobile terminal according to an embodiment. An elevator system 10 and the movement detection system in the embodiment of the present invention are described below with reference to FIG. 1 to FIG. 3.

In the elevator system 10 shown in FIG. 1, two elevator cars 110-1 and 110-2 are shown. It should be understood that the quantity of elevator cars 110 in the elevator system 10 is not limited. Each elevator car 110 can run vertically in a shaft in a building, so as to transport a passenger to a corresponding destination floor. It should be understood that the settings of the elevator cars 110-1 and 110-2 may be similarly applied to elevator cars of the elevator system 10.

The movement detection system in an embodiment includes a second Bluetooth module 130 disposed in each elevator car 110. For example, the second Bluetooth module 130-1 is disposed in the elevator car 110-1, and the second Bluetooth module 130-2 is disposed in the elevator car 110-2. Each second Bluetooth module 130 may be a Bluetooth beacon or a Bluetooth node, and can establish a communication connection with an elevator controller 500 in the elevator system 10 in which the elevator car 110 is located. In an embodiment, the second Bluetooth module 130 in the elevator car 110 may be, but not limited to, mounted on a destination floor registration control panel in the elevator car 110 or integrally disposed on the destination floor registration control panel. It should be understood that a mounting location of the second Bluetooth module 130 in the elevator car 110 is not limited thereto.

The second Bluetooth module 130 in each elevator car 110 can broadcast a second Bluetooth signal 131 that basically covers the interior of the elevator car 110. In an embodiment, the second Bluetooth module 130 may continuously broadcast the second Bluetooth signal 131 to the interior of the elevator car 110 during the operation of the elevator car 110. In another embodiment, the second Bluetooth module 130 may broadcast the second Bluetooth signal 131 to the interior of the elevator car 110 only when the elevator car 110 stops at a floor. The broadcasted second Bluetooth signal 131 may include current floor information, for example, a floor N, of the elevator car 110. The broadcasted second Bluetooth signal 131 may further include universally unique identifier (UUID) information of the second Bluetooth module 130.

The second Bluetooth module 130 can interact, by using the second Bluetooth signal 131, with a personal mobile terminal 200 carried by a passenger 90 inside the elevator car 110. During application, once the passenger 90 enters the elevator car 110 to take an elevator, the personal mobile terminal 200 first receives the second Bluetooth signal 131, and may identify the second Bluetooth signal 131 according to the UUID of the second Bluetooth signal 131. Moreover, the personal mobile terminal 200 may further determine, by identifying the second Bluetooth signal 131, a floor from which the passenger 90 enters the elevator car 110. Specifically, if a car door 113 is opened, the second Bluetooth module 130 may sequentially establish a second Bluetooth connection with a personal mobile terminal 200 of each passenger 90 who enters the elevator car 110, and perform communication based on a preset Bluetooth communication protocol. Once it is determined that a personal mobile terminal 200 successfully receives the second Bluetooth signal 131 broadcasted by the second Bluetooth module 130 or determined that a personal mobile terminal 200 has successfully established a second Bluetooth connection with the second Bluetooth module 130, the personal mobile terminal 200 or the second Bluetooth module 130 may determine that a passenger 90 corresponding to the personal mobile terminal 200 enters a corresponding elevator car 110 from an elevator landing area 410.

As shown in FIG. 1, the movement detection system in the elevator system 10 further includes a first Bluetooth module 150. The first Bluetooth module 150 is mounted in an elevator landing area 410, and may broadcast a first Bluetooth signal 151 to the elevator landing area 410, so as to basically cover the elevator landing area 410. In one case, the first Bluetooth signal 151 broadcasted by the first Bluetooth module 150 may further cover another adjacent area outside the elevator landing area 410. A personal mobile terminal 200 of a passenger 90 in the elevator landing area 410 or the adjacent area may receive the first Bluetooth signal 151. The first Bluetooth signal 151 may include floor information, for example, a floor N, of the elevator landing area 410 in which the first Bluetooth module 150 is located; and/or may include UUID information corresponding to the first Bluetooth module 150. Therefore, when receiving the first Bluetooth signal 151, the personal mobile terminal 200 can recognize the first Bluetooth signal and can determine a floor on which the first Bluetooth signal 151 is located.

The elevator landing area 410 may be, for example, a lobby. It should be noted that the shape and size of a specific area of the elevator landing area 410 may be determined according to the structure of a building, and its range may be not clearly defined as done by dotted lines shown in FIG. 1. The dotted lines in FIG. 1 only schematically define the elevator landing area 410. The boundary of the elevator landing area 410 may be relatively blurred. In the example in FIG. 1, passageways 411 and 412 are provided in the example of the elevator landing area 410. A passenger 90 may enter or leave the elevator landing area 410 through the passageways.

In an embodiment, some of the functions of the movement detection system in the elevator system 10 may be implemented by at least partially using the personal mobile terminal 200 carried by the passenger 90, for example, may be partially implemented by using the personal mobile terminal 200 shown in FIG. 2. A Bluetooth communication module 210 is disposed in the personal mobile terminal 200 carried by the passenger 90, and is configured with a corresponding Bluetooth communication protocol. As such, the Bluetooth communication module 210 is suitable for receiving the second Bluetooth signal 131 or the first Bluetooth signal 151 and is suitable for establishing a second Bluetooth connection with the second Bluetooth module 130 or a first Bluetooth connection with the first Bluetooth module 150.

The second Bluetooth module 130 or the first Bluetooth module 150 may be specifically a BLE module, and the second Bluetooth signal 131 broadcasted by the second Bluetooth module 130 or the first Bluetooth signal 151 broadcasted by the first Bluetooth module 150 is a correspondingly a BLE signal. The personal mobile terminal 200 is correspondingly a terminal that can adapt to BLE communication, for example, may be implemented by using a smart phone, a wearable smart device, a personal digital assistant (PAD) or the like (a Bluetooth communication module disposed in the terminal is a BLE module). As such, the Bluetooth communication interaction manner between the second Bluetooth module 130 or first Bluetooth module 150 and the personal mobile terminal 200 has low energy consumption.

It should be noted that specific signal forms of the second Bluetooth signal 131 and the first Bluetooth signal 132 are not limited. Generally, the second Bluetooth signal 131 and the first Bluetooth signal 132 have a characteristic that signal strengths of the signals attenuate as propagation distances of the signals increase. Therefore, especially for a personal mobile terminal 200 that receives the first Bluetooth signal, a distance between the personal mobile terminal 200 and the first Bluetooth module 150 may be approximately determined according to the signal strength of the first Bluetooth signal.

Correspondingly, during the interaction between each personal mobile terminal 200 and the second Bluetooth signal 131 or first Bluetooth signal 151, each personal mobile terminal 200 can determine the signal strength of the second Bluetooth signal 131 or first Bluetooth signal 151 received by the personal mobile terminal 200. In an embodiment, as shown in FIG. 2, a signal strength determination module 220 in the personal mobile terminal 200 can determine, based on the first Bluetooth signal 151, the signal strength of the first Bluetooth signal 151 received by the personal mobile terminal 200, and certainly can also determine the signal strength of the second Bluetooth signal 131 received by the personal mobile terminal 200. Specifically, the signal strength determination module 220 is implemented by using a received signal strength indicator (RSSI). The RSSI can determine the signal strength of the first Bluetooth signal 151 or any another Bluetooth signal received by the personal mobile terminal 200.

In a movement process in which a passenger 90 approaches an elevator car 130, a second Bluetooth signal 131 is generally received first. As a distance from the elevator car 130 decreases, a distance from a first Bluetooth module 150 also decreases approximately. Therefore, the signal strength of a received first Bluetooth signal 151 approximately grows gradually.

As shown in FIG. 2, a movement tracking module 230 is further disposed in each personal mobile terminal 200, and is configured to track a movement of the passenger 90 in the elevator landing area 410 by means of changes in the determined signal strength of the first Bluetooth signal 151.

Figure 3:
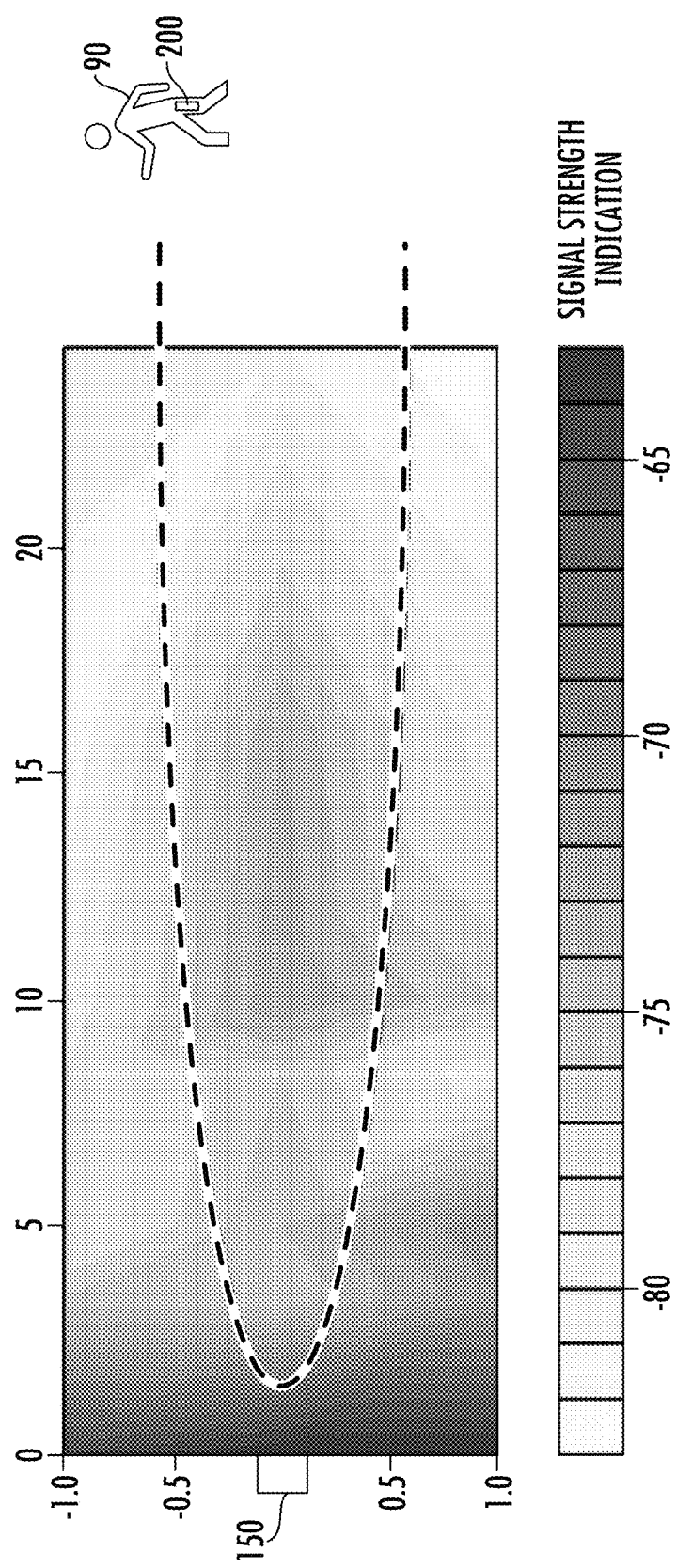
FIG. 3 is a schematic principle diagram of tracking a movement of a passenger.

Referring to FIG. 3, FIG. 3 exemplarily shows signal strength distribution of the first Bluetooth signal 151 broadcasted by the first Bluetooth module 150 in the elevator landing area 410. The signal strength is represented by using grayscale. If the passenger 90 moves in the elevator landing area 410, the signal strength at each movement point may be detected. According to signal strength data of all movement points, a movement path of a passenger 90 in the elevator landing area 410 may be approximately tracked. In an embodiment, the signal strength distribution diagram of the first Bluetooth signal 151 of the elevator landing area 410 may be stored in advance in the personal mobile terminal 200. For example, the movement detection system is used to provide the signal strength distribution diagram to the personal mobile terminal 200. A dotted-line movement path shown in FIG. 3 is used as an example. The passenger 90 first approaches the first Bluetooth module 150 and then leaves the first Bluetooth module 150. The received signal strength of the personal mobile terminal 200 first approximately increases gradually, and then approximately decreases gradually. According to analysis of a change direction (for example, the signal strength increases or decreases) of the signal strength data, it may be tracked that the movement of the passenger 90 is correspondingly approaching the first Bluetooth module 150 first and then leaving the first Bluetooth module 150. The foregoing analysis may include change direction analysis of the signal strength and may further include change magnitude analysis of the signal strength. The change direction may track whether the movement is approaching or leaving the first Bluetooth module 150, i.e., track a movement direction of the passenger 90 with respect to the first Bluetooth module 150 in the elevator landing area 410. A change magnitude (that is, a change amount) may represent a movement distance, so that a movement distance of the passenger 90 with respect to the first Bluetooth module 150 in the elevator landing area 410 is tracked.

The movement tracking module 230 may further generate corresponding Bluetooth movement data for each tracked movement. For example, the Bluetooth movement data may be data represented in the form of the Bluetooth signal strength, and may be generated in combination with the foregoing signal strength distribution diagram. It should be understood that the Bluetooth movement data is generated by a moving personal mobile terminal 200 that performs Bluetooth interaction with the first Bluetooth module 150. Changes in the data may approximately represent changes in a movement process. Therefore, the movement may be represented by using the Bluetooth movement data to a certain degree.

As shown in FIG. 2, a movement judgment module 240 is further disposed in a personal mobile terminal 200, and is configured to judge, according to whether each personal mobile terminal 200 successfully receives the second Bluetooth signal 131, whether the tracked movement is correspondingly a normal movement or an abnormal movement. As discussed above, when the car door 113 is opened, if a movement of a passenger 90 before entering the elevator car 110 is a normal movement, the passenger 90 will generally enter the elevator car 110. During judgment, once the passenger 90 receives the second Bluetooth signal 131, it may be basically determined that the passenger 90 will enter the elevator car 90 to take an elevator. Therefore, it may be determined that the movement tracked before is correspondingly a normal movement. Otherwise, it may be determined that the movement tracked before is correspondingly an abnormal movement. For example, the movement of the passenger 90 is a movement (a movement 920-2 shown in FIG. 1) passing the elevator landing area 410, or a movement (a movement 920-1 shown in FIG. 1) of entering the elevator landing area 410 and then leaving the elevator landing area 410.

To judge more accurately whether the passenger 90 enters the elevator car 90, the movement judgment module 240 further determines that the tracked movement is correspondingly a normal movement only when the personal mobile terminal 200 successfully receives the second Bluetooth signal whose signal strength is greater than or equal to a predetermined value 131, or otherwise judges that the tracked movement is an abnormal movement. The reason is that a passenger 90 who is near the opened car door 113 but does not enter the elevator car 110 may receive the second Bluetooth signal 131 (broadcasted from the elevator car 110) whose signal strength is relatively weak. By setting a predetermined value and judging whether the signal strength of the received second Bluetooth signal 131 is greater than or equal to the predetermined value, the accuracy of judgment can be improved. The predetermined value may be correspondingly a minimum value of the signal strength of the second Bluetooth signal 131 received by the passenger 90 inside the elevator car 110, and may be tested and determined in advance. The signal strength of the received second Bluetooth signal 131 is further judged. If the signal strength is less than the predetermined value, it is determined that the passenger 90 does not enter the elevator car 110, so that the movement tracked before is determined to be an abnormal movement.

In an embodiment, the movement judgment module 240 determines that the tracked movement is an abnormal movement if the personal mobile terminal 200 does not receive the second Bluetooth signal 151 within a predetermined time period after sending an elevator call request command or does not receive the second Bluetooth signal 151 whose signal strength is greater than or equal to a predetermined value.

In another embodiment, the movement judgment module 240 may determine whether the tracked movement is an abnormal movement or a normal movement in another manner, for example, through a manual input of the passenger 90.

The judgment result obtained by the movement judgment module 240 of the personal mobile terminal 200 may be transmitted to the second Bluetooth module 130 by using the second Bluetooth connection between the personal mobile terminal 200 and the second Bluetooth module 130, or may further be transmitted to the elevator controller 500 by using the second Bluetooth module 130.

The Bluetooth communication module 210, the signal strength determination module 220, the movement tracking module 230, and the movement judgment module 240 in the foregoing embodiment approximately form a Bluetooth interaction unit (not shown in the figure) in the personal mobile terminal 200 in this embodiment of the present invention.

As shown in FIG. 2, in an embodiment, a personal movement historical database 250 may be disposed in the personal mobile terminal 200. It should be understood that a corresponding personal movement historical database may be disposed for a historical movement corresponding to each passenger 90. As such, Bluetooth movement data generated by a movement behavior of each passenger 90 is recorded and stored in the personal movement historical database 250, to form historical Bluetooth movement data. A normal movement historical database or an abnormal movement historical database or both may be established in the personal movement historical database 250. Bluetooth movement data corresponding to a normal movement of each personal mobile terminal 200 is stored in the normal movement historical database of the personal movement historical database 250, and Bluetooth movement data corresponding to an abnormal movement of each personal mobile terminal 200 is stored in the abnormal movement historical database of the personal movement historical database 250. As such, in a data learning process in a historical database, analysis can be accurately performed to obtain a normal movement mode or an abnormal movement mode.

As shown in FIG. 2, in an embodiment, a machine learning unit 260 may be disposed in the personal mobile terminal 200. The machine learning unit 260 performs learning analysis on historical data in the personal movement historical database 250, so as to acquire a normal movement mode and/or an abnormal movement mode of a passenger. Based on the normal movement determined in the movement judgment module 240, the normal movement mode of the passenger is learned and acquired from the normal movement historical database in the personal movement historical database 250. Based on the abnormal movement determined in the movement judgment module 240, the abnormal movement mode of the passenger is learned and acquired from the abnormal movement historical database in the personal movement historical database 250.

Specific learning methods used by the machine learning unit 260 may be various machine learning classification technologies that exist or will emerge in the future, and are not limited. It should be understood that as the amount of data stored in the personal movement historical database 250 keeps increasing, an increasingly large amount of data in the normal movement historical database or the abnormal movement historical database is used for learning. The learning or training of the normal movement mode or the abnormal movement mode will become more accurate. Bluetooth movement data corresponding to each movement of approaching the elevator car 110 of each passenger 90 will be stored in the personal movement historical database 250. Therefore, learning results may be continuously improved.

As shown in FIG. 2, a movement prediction unit 270 may further be disposed in the personal mobile terminal 200. The movement prediction unit 270 predicts, based on the Bluetooth movement data, that a movement of a passenger 90 in the elevator landing area is a normal movement or an abnormal movement, so that it may be known as soon as possible or known in time whether a current movement of the passenger 90 is a normal movement or an abnormal movement. In an embodiment, the movement prediction unit 270 may predict, based on the currently generated Bluetooth movement data and historical Bluetooth movement data, that the movement of the passenger 90 in the elevator landing area is a normal movement or an abnormal movement. For example, the currently generated Bluetooth movement data is compared with the historical Bluetooth movement data corresponding to a normal movement or an abnormal movement and analyzed, so as to predict the movement of the passenger 90. If the historical Bluetooth movement data corresponds to the historical Bluetooth movement data of the passenger 90, the movement of the passenger 90 may be predicted more accurately. For example, a success rate of predicting that the movement of the passenger 90 is an abnormal movement is improved.

It should be noted that the historical Bluetooth movement data used by the movement prediction unit 270 may be from the foregoing personal movement historical database 250. Certainly, when the personal movement historical database 250 does not have historical Bluetooth movement data (for example, is used for the first time), the historical Bluetooth movement data may be set in advance in another manner. For example, the historical Bluetooth movement data is acquired in a manner such as downloading. Furthermore, historical Bluetooth movement data of a corresponding passenger 90 is acquired. Existing Bluetooth movement data corresponding to a normal movement and/or an abnormal movement is edited or categorized to form corresponding historical Bluetooth movement data.

In another embodiment, the movement prediction unit 270 may use the learning result of the machine learning unit 260 to predict a currently tracked movement, so as to predict more accurately that a current movement of the passenger 90 is a normal movement or an abnormal movement. Specifically, the personal mobile terminal 200 predicts the tracked movement based on the Bluetooth movement data received from the movement tracking module 230 and the normal movement mode and/or abnormal movement mode obtained through learning for the passenger 90, for example, predicts that the tracked movement is a normal movement or an abnormal movement. Even if each passenger 90 has a different movement or behavior of approaching the elevator car 110, as a normal movement mode or an abnormal movement mode are obtained through learning based on personalized historical data, the accuracy of prediction is high. Therefore, the movement detection system in the foregoing embodiment can automatically make an accurate prediction about a movement of each passenger 90, but does need to wait till it is judged whether the passenger 90 enters the elevator car 90 or does not need to wait till the movement of the passenger 90 in the elevator landing area completely ends. Moreover, an abnormal movement of the passenger 90 can be automatically recognized.

It should be understood that the foregoing learning process is not limited to learning of historical Bluetooth movement data of a normal movement or an abnormal movement corresponding to the passenger to obtain a normal movement mode and/or an abnormal movement mode, and for example, may further perform learning according to historical Bluetooth movement data of normal movements or abnormal movements of other passengers to obtain a normal movement mode and/or an abnormal movement mode of a corresponding landing area.

It should be noted that as an increasingly large amount of Bluetooth movement data is generated, historical Bluetooth movement data of determined or judged normal movements or abnormal movements keeps growing. Therefore, a normal movement mode and/or an abnormal movement mode obtained through learning may become more accurate, and the accuracy of prediction is improved.

It should be noted that because a movement of a passenger 90 is a continuous process, tracking of the movement is also a continuous process. The tracked movement is continuously updated, and Bluetooth movement data corresponding to the tracked movement is continuously updated. It should be understood that as a movement takes place, the tracked movement is more complete, an amount of Bluetooth movement data for prediction corresponding to the movement increases, and the accuracy of prediction becomes higher. Therefore, in an embodiment, the prediction is a continuous process. For example, when a tracked movement corresponds to an initial movement, an amount of correspondingly generated Bluetooth movement data is relatively small, and the accuracy of prediction is relatively low. As the tracked movement continues, the accuracy of prediction may be higher. During prediction, the movement prediction unit 270 approximately calculates the accuracy of prediction at the same time, and outputs the prediction result when the accuracy is greater than or equal to a predetermined value.

The prediction result obtained by the movement prediction unit 270 of the personal mobile terminal 200 may be transmitted to the first Bluetooth module 150 by using a first Bluetooth connection between the personal mobile terminal 200 and the first Bluetooth module 150, or may further be transmitted to the elevator controller 500 by using the first Bluetooth module 150.

The prediction of the movement detection system in the foregoing embodiment for the movement of the passenger 90 is very meaningful, especially for the elevator system 10 that automatically implements an elevator call operation based on a movement of approaching the elevator car 110 of the passenger 90.

The elevator system 10 that implements an input-free automatic elevator call operation at least based on the personal mobile terminal 200 and the first Bluetooth module 150 is used as an example. As shown in FIG. 1, in a movement process in which the passenger 90 approaches the elevator car 110, the first Bluetooth module 150 mounted in each elevator landing area 410 may implement Bluetooth interaction with the personal mobile terminal 200 carried by the passenger 90, so as to implement the function of an automatic elevator call operation. Specifically, the first Bluetooth module 150 may continuously transmit or broadcast the first Bluetooth signal 151. In the movement process in which the passenger 90 approaches the elevator car 110, the personal mobile terminal 200 also approaches the first Bluetooth module 150. Once the passenger 90 enters the elevator landing area 410, the personal mobile terminal 200 may automatically establish a first Bluetooth connection with the first Bluetooth module 150, so that the personal mobile terminal 200 automatically sends an elevator call request command to the first Bluetooth module 150. The second Bluetooth module 150 receives the elevator call request command and automatically sends the elevator call request command to the elevator controller 500 connected to the second Bluetooth module 150.

In an embodiment, a distance between the personal mobile terminal 200 and the first Bluetooth module 150 may be determined according to the signal strength of the first Bluetooth signal received by the personal mobile terminal 200. When the distance is less than or equal to a predetermined distance threshold, the personal mobile terminal 200 automatically establishes the first Bluetooth connection with the first Bluetooth module 150.

Specifically, the elevator call request command may be preset in the personal mobile terminal 200, and may be an elevator call request command that includes an elevator call direction and/or a destination floor. The first Bluetooth module 150 may establish a communication connection with the elevator controller 500 of the elevator system, and automatically send the elevator call request command to the elevator controller 500. The elevator controller 500 is configured to control the operation of a plurality of elevator cars 110 in the elevator system 10. For example, the elevator controller 500 performs scheduling control based on the elevator call request command, and appoints one of the elevator cars 110 to stop at a floor or a landing of the passenger 90 and transport the passenger 90 to a corresponding destination floor. The appointed elevator car 110 also registers the destination floor of the passenger 90 in advance, for example, automatically registers a destination floor in the destination floor registration control panel. As such, the passenger 90 may completely implement an automatic elevator call operation, and may implement an elevator call operation without performing a manual operation or without providing an input.

However, when a movement of approaching the elevator car 110 of a passenger 90 cannot represent an actual elevator-taking intention of the passenger 90, an invalid elevator call operation may be caused, which severely affects the operation efficiency of the elevator system 10. To avoid an invalid elevator call operation, in an embodiment, the elevator system 10 or the movement detection system used by the elevator system 10 may cancel an elevator call request command sent corresponding to the movement when a tracked movement is predicted to be an abnormal movement. Further, the elevator controller 500 may not schedule the elevator car for the passenger 90, or the elevator system 10 may further cancel previous scheduling arranged for the passenger 90. In another embodiment, when the tracked movement is predicted to be an abnormal movement, the elevator controller 500 or the first Bluetooth module 150 is used to ignore or cancel the elevator call request command sent by the personal mobile terminal 200 corresponding to the movement. As such, the operation efficiency of the elevator system 10 can be improved.

In an example of a passenger movement, as shown in FIG. 1, a passenger 90 first moves towards the elevator landing area 410 and enters the elevator landing area 410 through the passageway 411. When the passenger 90 enters the elevator landing area 410, a personal mobile terminal 200 can automatically establish a first Bluetooth connection with the first Bluetooth module 150 and send an elevator call request command. The passenger 90 subsequently leaves from the elevator landing area 410 (for example, because the passenger 90 changes an elevator-taking intention). A movement 920-1 schematically shown by a dotted line arrow in FIG. 1 occurs correspondingly. The signal strength of a first Bluetooth signal 151 received by the personal mobile terminal 200 approximately increases gradually from 0, and then approximately decreases to 0 gradually. Based on the changes (for example, including a change direction and a change magnitude) of the signal strength, the movement 920-1 may be tracked. Further, the movement prediction unit 270 analyzes Bluetooth movement data corresponding to the movement 920-1. Specifically, for example, the movement prediction unit 270 compares and analyzes the Bluetooth movement data corresponding to the movement 920-1 with an abnormal movement mode generated according to historical Bluetooth movement data. As such, the movement prediction unit 270 may predict that the currently tracked movement 920-1 is an abnormal movement. Moreover, because the passenger 90 does not enter any elevator car 110 within a predetermined time (for example, 5 minutes) after the elevator call request command is sent, it may further be determined that the movement 920-1 is an abnormal movement, and Bluetooth movement data corresponding to the movement 920-1 is stored in the abnormal movement historical database of the personal movement historical database 250, so as to facilitate more accurate subsequent prediction of this type of movement.

In another example of a passenger movement, as shown in FIG. 1, a passenger 90 first moves towards the elevator landing area 410 and enters the elevator landing area 410 through the passageway 411. When the passenger 90 enters the elevator landing area 410, the personal mobile terminal 200 can automatically establish a first Bluetooth connection with the first Bluetooth module 150 and send an elevator call request command. When the elevator car 110-1 reaches the floor and the car door 113-1 is opened, the passenger 90 enters the elevator car 110-1, and a movement 910-1 schematically shown by a dotted line arrow in FIG. 1 occurs correspondingly. The signal strength of the first Bluetooth signal 151 received by the personal mobile terminal 200 approximately increases from 0 gradually, and then suddenly drops to 0. Based on the changes (for example, including a change direction and a change magnitude) of the signal strength, the movement 910-1 may be tracked. Because the passenger 90 enters the elevator car 110-1 within a predetermined time (for example, 5 minutes) after the elevator call request command is sent, the personal mobile terminal 200 may receive the second Bluetooth signal 131-1, so that it is determined that the movement 910-1 is a normal movement. Moreover, Bluetooth movement data corresponding to the movement 910-1 is stored in the normal movement historical database of the personal movement historical database 250, so as to facilitate more accurate subsequent prediction of this type of movement. Certainly, the movement prediction unit 270 may analyze the Bluetooth movement data corresponding to the movement 910-1 and compare and analyze the Bluetooth movement data corresponding to the movement 910-1 with the normal movement mode generated according to historical data, so as to predict sooner that the currently tracked the movement 910-1 is a normal movement.

In still another example of a passenger movement, as shown in FIG. 1, the passenger 90 first moves towards the elevator landing area 410 and enters the elevator landing area 410 through the passageway 411. When the passenger 90 enters the elevator landing area 410, the personal mobile terminal 200 can automatically establish a first Bluetooth connection with the first Bluetooth module 150 and send an elevator call request command. The passenger 90 subsequently leaves from another passageway 412 (for example, the passenger 90 passes through the elevator landing area 410) of the elevator landing area 410. A movement 920-2 schematically shown by a dotted line arrow in FIG. 1 occurs correspondingly. The signal strength of the first Bluetooth signal 151 received by the personal mobile terminal 200 approximately increases from 0 gradually, and then approximately decreases to 0 gradually. Based on the changes (for example, including a change direction and a change magnitude) of the signal strength, the movement 920-2 may be tracked. Further, the movement prediction unit 270 analyzes Bluetooth movement data corresponding to the movement 920-2, and compares and analyzes Bluetooth movement data corresponding to the movement 920-2 with the abnormal movement mode generated according to historical data, so that it may be predicted that the currently tracked the movement 920-2 is an abnormal movement. Moreover, because the passenger 90 does not enter any elevator car 110 within a predetermined time (for example, 5 minutes) after the elevator call request command is sent, it may also be determined that the movement 920-2 is an abnormal movement, and the Bluetooth movement data corresponding to the movement 920-2 is stored in the abnormal movement historical database of the personal movement historical database 250, so as to facilitate more accurate subsequent prediction of this type of movement.

In yet another example of a passenger movement, as shown in FIG. 1, the passenger 90 first moves towards the elevator landing area 410 and enters the elevator landing area 410 through the passageway 411. When the passenger 90 enters the elevator landing area 410, the personal mobile terminal 200 can automatically establish a first Bluetooth connection with the first Bluetooth module 150 and send an elevator call request command. When the elevator car 110-2 reaches the floor and the car door 113-2 is opened, the passenger 90 enters the elevator car 110-2. A movement 910-2 schematically shown by a dotted line arrow in FIG. 1 occurs correspondingly. The signal strength of a first Bluetooth signal 151 received by the personal mobile terminal 200 approximately increases from 0 gradually, then gradually decreases to a particular value, and then suddenly drops to 0. Based on the changes (for example, including a change direction and a change magnitude) of the signal strength, the movement 910-2 may be tracked. Because the passenger 90 enters the elevator car 110-2 within a predetermined time (for example, 5 minutes) after the elevator call request command is sent, the personal mobile terminal 200 may receive the second Bluetooth signal 131-2, so that it is determined that the movement 910-2 is a normal movement, and the Bluetooth movement data corresponding to the movement 910-2 is stored in the normal movement historical database of the personal movement historical database 250, so as to facilitate more accurate subsequent prediction of this type of movement. Certainly, the movement prediction unit 270 may analyze Bluetooth movement data corresponding to the movement 910-1 in advance and compare and analyze the Bluetooth movement data corresponding to the movement 910-2 with the normal movement mode generated according to historical data, so that it may be predicted or determined that the currently tracked the movement 910-2 is a normal movement.

The abnormal movements 920-1 and 920-2 may be predicted in advance. Therefore, the elevator system 10 cancels or ignores in time an elevator call request command caused by the movement, or changes in time a scheduling arrangement, thereby greatly improving the operation efficiency of an elevator.

Figure 4:
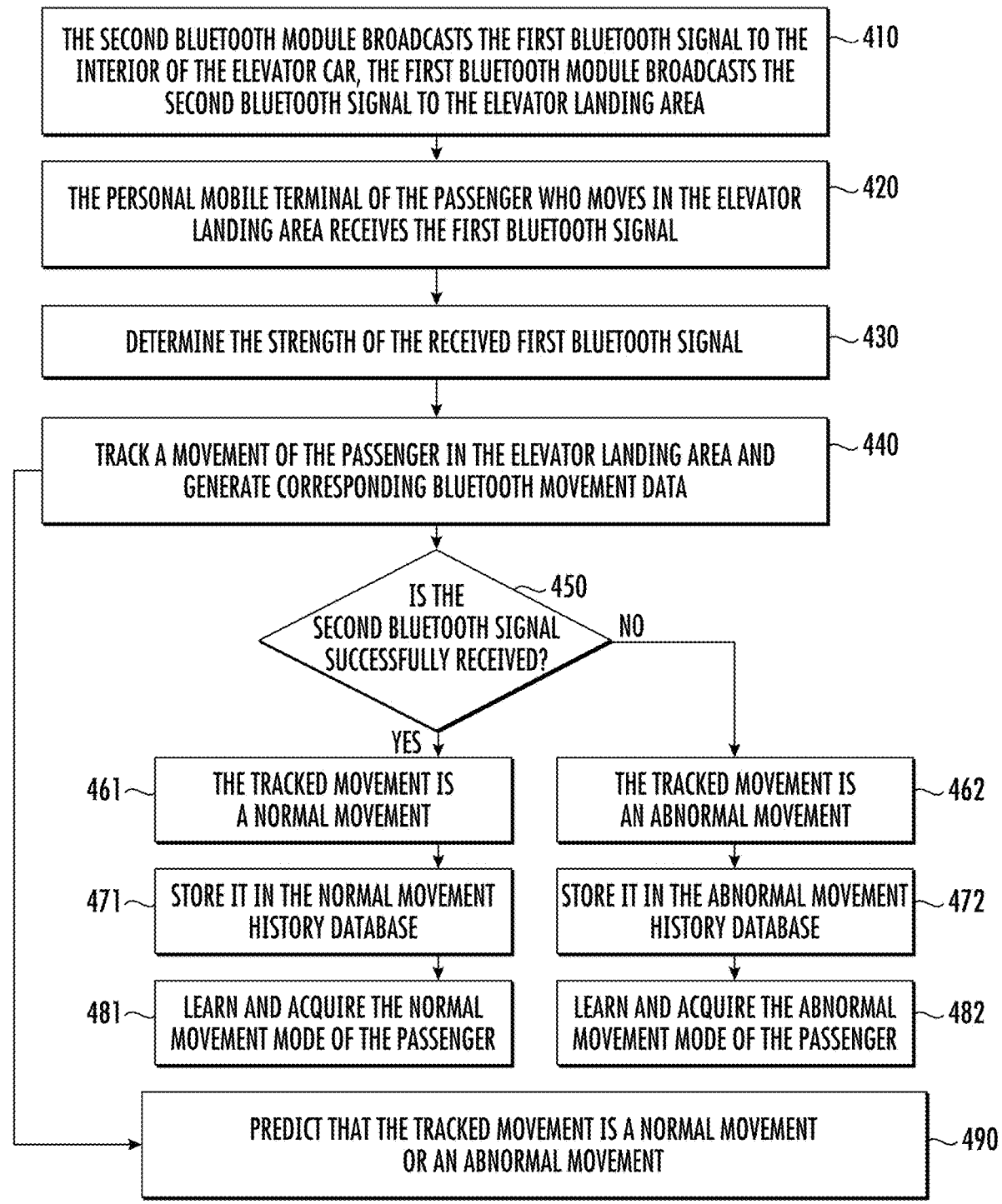
FIG. 4 is a schematic flowchart of a movement detection method for a passenger according to an embodiment of the present invention.

FIG. 4 is a schematic flowchart of a movement detection method for a passenger according to an embodiment of the present invention. The movement detection method in this embodiment of the present invention is described below with reference to FIG. 1, FIG. 2, and FIG. 4, and includes a process of movement prediction and a process of movement mode learning.

First, in a normal case, the second Bluetooth module 130 broadcasts the second Bluetooth signal 131 to the interior of the elevator car 110, and the first Bluetooth module 150 broadcasts the first Bluetooth signal 151 to the elevator landing area 410. The first Bluetooth module 150 may continuously broadcast the first Bluetooth signal 151, and the second Bluetooth module 130 broadcasts the second Bluetooth signal 131 at least when stopping at a floor. The signal strengths of the first Bluetooth signal 131 and the first Bluetooth signal 151 may be determined in advance, and decrease as propagation distances of the signals increase. When each passenger 90 moves in the elevator landing area 410, the following steps S420 to S490 are correspondingly performed.

Further, in step S420, a personal mobile terminal 200 of the passenger 90 who moves in the elevator landing area 410 receives the first Bluetooth signal 151, and may recognize the first Bluetooth signal 151, so as to determine a floor of the elevator landing area 410 in which a movement occurs. The movement in the elevator landing area 410 may include a movement of approaching the elevator car 110 of the passenger 90, and certainly may include an abnormal movement, for example, a movement of leaving the elevator car 110.

Further, in step S430, the signal strength of the received first Bluetooth signal 151 is determined, so that changes in the received first Bluetooth signal 151 that occur as the passenger 90 moves may be determined in real time. Step S430 may be completed in the signal strength determination module 220 of the personal mobile terminal 200.

Further, in step S440, the movement of the passenger 90 in the elevator landing area 410 is tracked, and corresponding Bluetooth movement data is generated. In this embodiment of the present invention, the movement is tracked by means of the determined changes in the signal strength of the first Bluetooth signal 151. Step S440 may be completed in the movement tracking module 230 of the personal mobile terminal 200. For a specific tracking principle, refer to the foregoing exemplary description about the movement tracking module 230.

Further, in step S450, it is judged whether the second Bluetooth signal is successfully received. In an embodiment, it is judged whether the second Bluetooth signal 131 is successfully received within a predetermined time after the personal mobile terminal 200 automatically sends an elevator call request command. In another embodiment, it is judged whether the second Bluetooth signal 131 whose signal strength is greater than or equal to the predetermined signal strength is successfully received.

If the second Bluetooth signal 131 whose signal strength is greater than or equal to the predetermined signal strength is successfully within the predetermined time, it indicates that the passenger 90 enters the elevator car 110. The process turns to step S461 to determine that the tracked movement is correspondingly a normal movement. Further, in step S471, Bluetooth movement data corresponding to a normal movement of each personal mobile terminal 200 is stored in the normal movement historical database of the personal movement historical database 250, so as to update the normal movement historical database.

If the second Bluetooth signal 131 whose signal strength is greater than or equal to the predetermined signal strength is not successfully received within the predetermined time period, the judgment result is "no", indicating that the passenger 90 does not enter the elevator car 110. The process turns to step S462 to determine that the tracked movement is correspondingly an abnormal movement. Further, in step S472, Bluetooth movement data corresponding to an abnormal movement of each personal mobile terminal 200 is stored in the abnormal movement historical database of the personal movement historical database 250, so as to update the abnormal movement historical database.

The foregoing steps S450, S461, S462, S471, and S472 may be completed in the movement judgment module 240 of the movement detection system. It should be noted that the personal movement historical database 250 and/or movement prediction unit 270 are not limited to being disposed in each personal mobile terminal 200, and for example, may be disposed in a server of the elevator system 10, or may further be implemented in a manner of cloud storage of the cloud. After each judgment, Bluetooth movement data may be transferred in real time to the personal movement historical database 250. Alternatively, the Bluetooth movement data may be transferred to the personal movement historical database 250 according to a predetermined time interval or in batches according to a predetermined amount.

Further, the process turns to a machine learning stage, that is, step S481 and/or step S482. In step S481, a normal movement mode of a passenger is learned and acquired from the normal movement historical database based on the determined normal movement. In step S482, an abnormal movement mode of a passenger is learned and acquired from the abnormal movement historical database based on the determined abnormal movement.

The foregoing step S481 or step S482 is completed in the machine learning unit 260. It should be noted that the machine learning unit 260 is not limited to being disposed in each personal mobile terminal 200, and, for example, may be disposed in a server of the elevator system 10, or may further be implemented by using cloud computing of the cloud. Specifically, machine learning may be performed after each update of a historical database, or may be performed according to a predetermined time interval.

The foregoing steps S440 to step S481 or S482 are correspondingly a process of implementing movement mode learning, and do not need to be performed in each process of movement detection. For example, the foregoing steps S440 to step S481 or S482 may even be omitted after the normal movement mode or the abnormal movement mode is obtained.

After step S440, step S490 may further be performed to predict that the tracked movement is a normal movement or an abnormal movement. That is, the type of the tracked movement is judge in advance before the step S461 or S462, so that an abnormal movement can be detected in advance. The judgment may be performed by using a historical learning result generated in step S481 or S482. For example, it is predicted, based on the Bluetooth movement data received from the movement tracking module 230 and the normal movement mode and/or abnormal movement mode of the passenger learned and acquired by the machine learning unit 260, that the tracked movement is a normal movement or an abnormal movement.

Especially, when the tracked movement is predicted to be an abnormal movement, the movement tracking module 230 sends a corresponding message to the personal mobile terminal 200, the first Bluetooth module 150, and/or the elevator controller 500. As such, an elevator call request command automatically generated corresponding to the abnormal movement can be cancelled in time, or a scheduling arrangement of the elevator call request command automatically generated corresponding to the abnormal movement can be cancelled in time.

Figure 5:
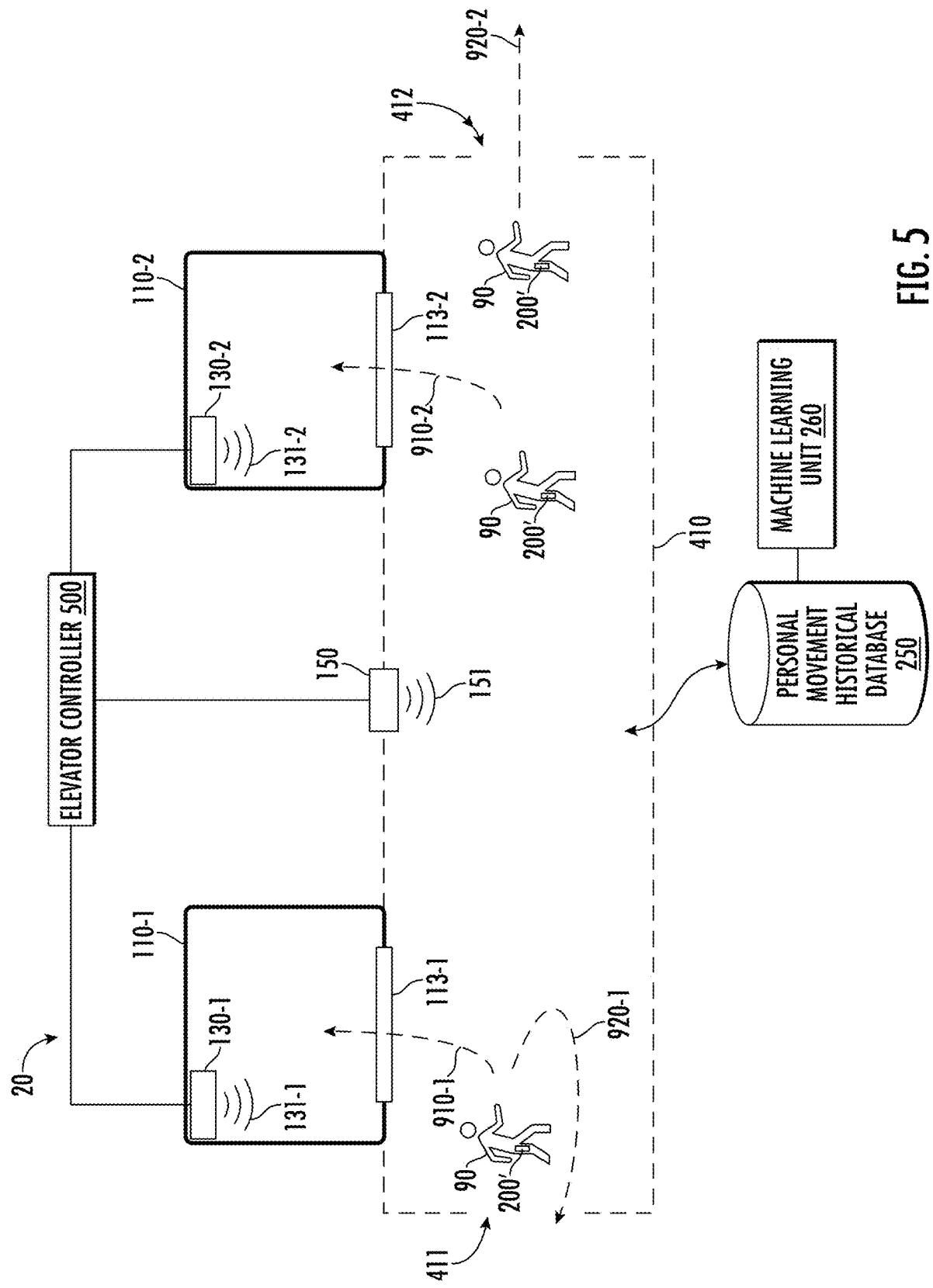
FIG. 5 is a schematic diagram of an elevator system according to another embodiment of the present invention, and at the same time schematically shows a movement detection system for a passenger according to another embodiment.
Figure 6:
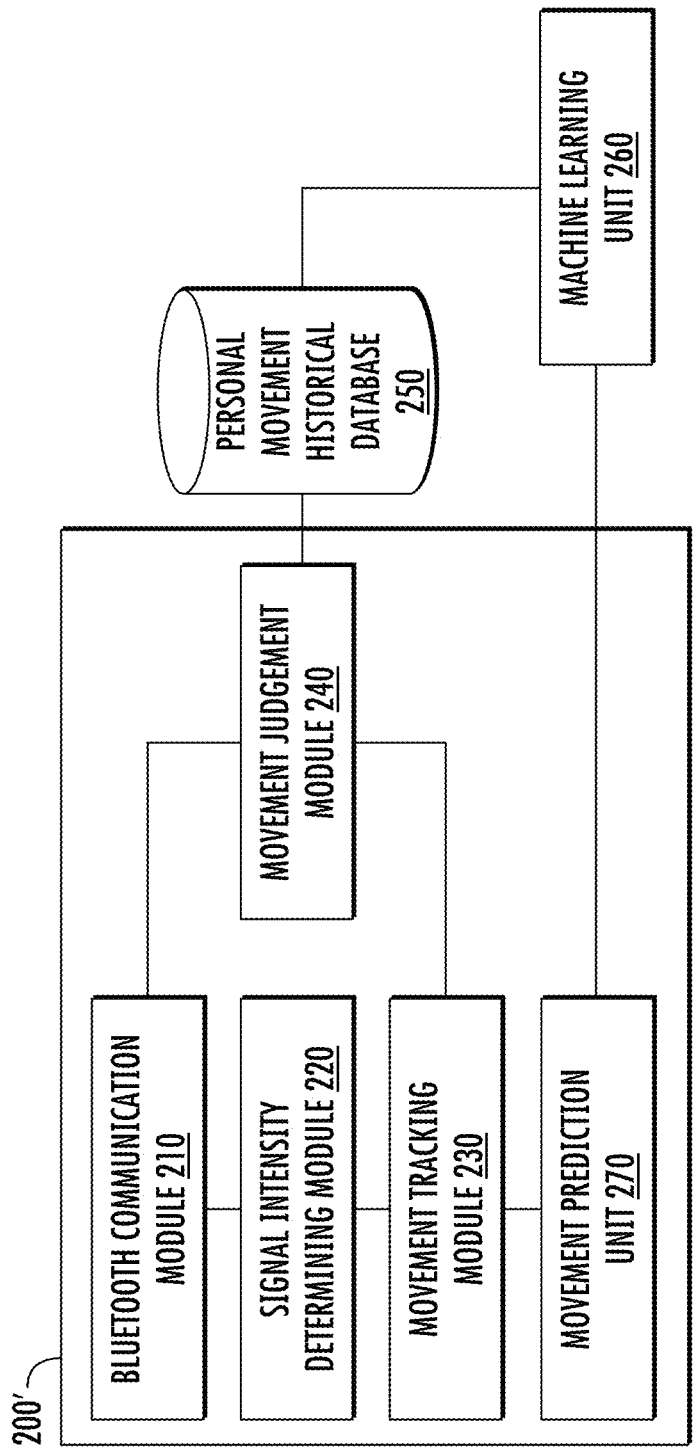
FIG. 6 is a schematic diagram of a modular structure when at least a part of the movement detection system shown in FIG. 1 is implemented by using a personal mobile terminal according to another embodiment.

FIG. 5 is a schematic diagram of an elevator system according to another embodiment of the present invention, and at the same time schematically shows a movement detection system for a passenger according to another embodiment. FIG. 6 is a schematic diagram of a modular structure when at least a part of the movement detection system shown in FIG. 1 is implemented by using a personal mobile terminal according to another embodiment.

Compared with the personal mobile terminal 200 in the embodiment shown in FIG. 2, a main change in a personal mobile terminal 200' in the embodiment shown in FIG. 6 used in the movement detection system lies in that the personal movement historical database 250 and the machine learning unit 260 are not disposed in the personal mobile terminal 200'. A Bluetooth communication module 210, the signal strength determination module 220, a movement tracking module 230, a movement judgment module 240, and a movement prediction unit 270 similar to those in the personal mobile terminal 200 in FIG. 2 are disposed in the personal mobile terminal 200'. They are no longer elaborated herein. The movement judgment module 240 may submit Bluetooth movement data to an external personal movement historical database 250 in a manner of wireless communication. During working, the movement prediction unit 270 may retrieve the normal movement mode or the abnormal movement mode in the machine learning unit 260 in a manner of wireless communication.

Corresponding to the personal mobile terminal 200' in the embodiment shown in FIG. 6, in the elevator system 20 in embodiment shown in FIG. 5, the personal movement historical database 250 is disposed for each personal mobile terminal 200'. For example, a plurality of personal movement historical databases 250 may be implemented in a server, or may be implemented by using cloud storage of the cloud. The machine learning unit 260 may be disposed corresponding to one or more personal movement historical databases 250, and for example, may be implemented in a server, or may be implemented by using cloud computing of the cloud.

With reference to the descriptions of the foregoing examples, those skilled in the art should understand that at least one of the Bluetooth communication module 210, the signal strength determination module 220, the movement tracking module 230, the movement judgment module 240, and the movement prediction unit 270 used in the movement detection system may be disposed outside the personal mobile terminal 200 or 200' according to a specific requirement. For example, the movement judgment module 240, the movement prediction unit 270, and the like may be disposed outside the personal mobile terminal 200 or 200'. Specifically, the movement prediction unit 270 and the machine learning unit 260 may be disposed together in a server. A result predicted by the movement prediction unit 270 may be delivered in time to a corresponding personal mobile terminal.

Because the movement detection system for a passenger is applied, in the elevator system 10 or 20 in the foregoing embodiment, an abnormal movement of a passenger can be automatically detected, so that the elevator system 10 can judge an invalid elevator call request command. As such, scheduling arrangements are more accurate and appropriate, thereby greatly improving the operation efficiency of the elevator system.

It should be understood that the movement detection system for a passenger in the foregoing embodiments of the present invention is not limited to being applied to the elevator system 10 in the foregoing embodiments, and may further be applied to elevator systems having an automatic elevator call function in other embodiments. For example, the first Bluetooth module 150 is replaced with a wireless node that broadcasts or transmits another radio signal and can wirelessly interact with a personal mobile terminal 200. The first Bluetooth module 150 sends an elevator call request command regarding an elevator call direction.

It should be understood that the "Bluetooth connection" herein includes "Bluetooth communication", for example, Bluetooth communication based on a Bluetooth protocol.

Those skilled in the art should understand that aspects of the present invention may be embodied as systems, methods or computer program products. Therefore, the aspects of the present invention may use the following forms: a complete hardware implementation, a complete software implementation (including firmware, resident software, microcode, and the like), or an implementation that is generally referred to as a "service", "circuit", "circuit system", "module" and/or "processing system" herein and combines software and hardware aspects. In addition, the aspects of the present invention may be embodied in the form of a computer program product in one or more computer readable media on which computer readable program code is implemented.

Any combination of one or more computer readable media may be used. The computer readable medium may be a computer readable signal medium or a computer readable storage medium. The computer readable storage medium may be, for example, but is not limited to, an electronic, magnetic, optical, electromagnetic, infrared or semiconductor system, device or apparatus, or any suitable combination of the foregoing items. More specific examples (a non-exhaustive list) of the computer readable storage medium include the following items: an electrical connection having one or more wires, a portable computer magnetic disk, a hard disk, a random-access memory (RAM), a read-only memory (ROM), an erasable programmable read-only memory (EPROM or a flash memory), an optical fiber, a compact disc read-only memory (CD-ROM), an optical storage apparatus, a magnetic storage apparatus, or any suitable combination of the foregoing items. In the context of the document, the computer readable storage medium may be any tangible medium that may contain or store instructions used for execution by systems, devices or apparatuses or used in combination with systems, devices or apparatuses.

Program code and/or executable instructions embodied on a computer readable medium may be transmitted by using any suitable medium, including, but not limited to, a wireless medium, a wired medium, an optical fiber cable, and RF, or any suitable combination of the foregoing items.

Computer program code used to implement the operations of the aspects of the present invention may be compiled by using one programming language or any combination of programming languages including an object-oriented programming language such as Java, Smalltalk, and C++ and a conventional program programming language such as the "C" programming language or a similar programming language. The program code may be completely executed on a computer (apparatus) of a user, partially executed on the computer of the user, executed as an independent software package, partially executed on the computer of the user and partially executed on a remote computer, or completely executed on the remote computer or a server. In the latter cases, the remote computer may be connected to the computer of the user by using any type of network including a local area network (LAN) or a wide area network (WAN), or may be connected (for example, connected through the Internet by using an Internet service provider) to an external computer.

A computer program instruction may be provided to a processor of a general-purpose computer, a processor of a special-purpose computer, for example, a graphics processing unit or another programmable data processing device to produce a machine, so that the instruction executed by a processor of a computer or another programmable data processing device creates manners for implementing the functions/acts designated in one or more blocks in the flowcharts and/or block diagrams.

A computer program instruction may be loaded to a computer, another programmable data processing device or another apparatus, to perform a series of operation steps on the computer, another programmable device or another apparatus, so as to generate a computer-implemented process, so that the instruction executed on the computer or another programmable device provides a process used for implementing designated functions and acts herein.

It should further be noted that in some alternative implementations, the functions/operations noted in the blocks may occur out of the order noted in the flowcharts. For example, two blocks shown in succession may, in fact, be executed substantially concurrently, or these blocks may sometimes be executed in the reverse order, depending upon the functions/operations involved. Although specific step orders are shown, disclosed and required, it should be understood that the steps can be implemented, separated or combined in any order, and are still benefited by the present disclosure unless otherwise indicated Examples are used in this specification to disclose the present invention, include optimal modes, and enable any of those skilled in the art to implement the present invention, including manufacturing and using any apparatus or system and performing any covered method. The patent scope of the present invention is defined by the claims, and may include other examples conceived of by those skilled in the art. If other examples of such types have structural elements that are not literally different from those in the claims, or if other examples of such types include equivalent structural elements that do not have substantial literal differences from those in the claims, the examples shall fall within the scope of the claims.

The invention claimed is:

1. A movement detection system for a passenger, comprising: a first Bluetooth module mounted in an elevator landing area and configured to broadcast a first Bluetooth signal to the elevator landing area, wherein
   the movement detection system receives the first Bluetooth signal by a personal mobile terminal carried by the passenger, and generates Bluetooth movement data corresponding to a movement of the passenger in the elevator landing area; and
   the movement detection system further comprises:
   a movement prediction unit configured to predict, based on the Bluetooth movement data, that the movement of the passenger in the elevator landing area is a normal movement or an abnormal movement;
   wherein the movement detection system further comprises a signal strength determination module and a movement tracking module that are disposed in the personal mobile terminal;
   wherein:
   the signal strength determination module is configured to determine the signal strength of the first Bluetooth signal received by the personal mobile terminal; and
   the movement tracking module is configured to track the movement of the passenger in the elevator landing area by means of changes in the determined signal strength of the first Bluetooth signal, and generate the Bluetooth movement data corresponding to the movement.

2. The movement detection system according to claim 1, wherein the movement prediction unit is further configured to predict, based on the Bluetooth movement data and historical Bluetooth data, that the movement of the passenger in the elevator landing area is a normal movement or an abnormal movement, wherein the historical Bluetooth movement data comprises historical Bluetooth movement data corresponding to the normal movement and/or abnormal movement.

3. The movement detection system according to claim 2, wherein the historical Bluetooth data is historical Bluetooth data corresponding to the passenger.

4. The movement detection system according to claim 3, wherein the movement detection system further comprises:
   a personal movement historical database, disposed corresponding to the personal mobile terminal, and storing historical Bluetooth movement data corresponding to the passenger.

5. The movement detection system according to claim 1, wherein the movement detection system tracks the corresponding movement of the passenger in the elevator landing area based on Bluetooth interaction between the personal mobile terminal and the first Bluetooth module, so as to generate the Bluetooth movement data corresponding to the movement.

6. The movement detection system according to claim 1, further comprising: a machine learning unit configured to learn and acquire a normal movement mode from historical Bluetooth movement data corresponding to the normal movement, and/or configured to learn and acquire an abnormal movement mode from historical Bluetooth movement data corresponding to the abnormal movement.

7. The movement detection system according to claim 3, further comprising: a machine learning unit configured to learn and acquire a normal movement mode of the passenger from historical Bluetooth movement data corresponding to the normal movement of the passenger, and/or configured to learn and acquire an abnormal movement mode of the passenger from historical Bluetooth movement data corresponding to the abnormal movement of the passenger.

8. The movement detection system according to claim 6, wherein the movement prediction unit is further configured to predict, based on the generated Bluetooth movement data and the normal movement mode and/or abnormal movement mode, that the movement of the passenger in the elevator landing area is a normal movement or an abnormal movement.

9. The movement detection system according to claim 1, wherein the movement tracking module is further configured to analyze a change direction of the signal strength of the first Bluetooth signal, and track a movement direction of the passenger with respect to the first Bluetooth module in the elevator landing area based on the change direction.

10. The movement detection system according to claim 1, wherein the movement tracking module is further configured to analyze a change magnitude of the signal strength of the first Bluetooth signal, and track a movement distance of the passenger with respect to the first Bluetooth module in the elevator landing area based on the change magnitude.

11. The movement detection system according to claim 1, further comprising a second Bluetooth module mounted in an elevator car and configured to broadcast a second Bluetooth signal to the interior of the elevator car, wherein
the movement detection system further comprises a movement judgment module disposed in the personal mobile terminal, wherein the movement judgment module is configured to judge, according to whether the personal mobile terminal successfully receives the second Bluetooth signal, whether the tracked movement is a normal movement or an abnormal movement.

12. The movement detection system according to claim 11, wherein the movement judgment module is further configured to:
judge that the tracked movement is a normal movement if the personal mobile terminal successfully receives the second Bluetooth signal whose signal strength is greater than or equal to a predetermined value; and/or
judge that tracked movement is an abnormal movement if the personal mobile terminal does not receive the second Bluetooth signal within a predetermined time period after sending an elevator call request command or does not receive the second Bluetooth signal whose signal strength is greater than or equal to a predetermined value.

13. The movement detection system according to claim 4, wherein the Bluetooth movement data corresponding to the normal movement or the abnormal movement of the passenger is stored respectively in a normal movement historical database or an abnormal movement historical database of the personal movement historical database.

14. The movement detection system according to claim 11, wherein the second Bluetooth module and/or an elevator controller of an elevator system is further configured to receive the judgment result for the tracked movement.

15. The movement detection system according to claim 1, wherein the movement prediction unit is further configured to transmit the result about the movement predicted by the movement prediction unit to at least one of the personal mobile terminal, the first Bluetooth module, and an elevator controller of an elevator system.

16. The movement detection system according to claim 1, wherein the movement detection system is further configured to: if the movement of the passenger in the elevator landing area is predicted to be an abnormal movement, skip automatically sending an elevator call request command or cancel an elevator call request command sent corresponding to the movement.

17. The movement detection system according to claim 1, wherein the movement detection system is further configured to provide the signal strength distribution diagram of the first Bluetooth signal of each elevator landing area to the personal mobile terminal.

18. The movement detection system according to claim 4, wherein at least one of the personal movement historical database and the movement prediction unit of the movement detection system is disposed in the personal mobile terminal.

19. The movement detection system according to claim 4, further comprising a server configured to implement one or more of the personal movement historical database and the movement prediction unit of the movement detection system.

20. A movement detection method for a passenger, the method comprising:
receiving, by a personal mobile terminal carried by the passenger, a first Bluetooth signal broadcasted by a first Bluetooth module mounted in an elevator landing area;
generating Bluetooth movement data corresponding to a movement of the passenger in the elevator landing area;
predicting, based on the Bluetooth movement data, that the movement of the passenger in the elevator landing area is a normal movement or an abnormal movement;
determining the signal strength of the first Bluetooth signal received by the personal mobile terminal;
tracking the movement of the passenger in the elevator landing area by means of changes in the determined signal strength of the first Bluetooth signal; and
generating the Bluetooth movement data corresponding to the movement.

* * * * *